US008558492B2

(12) United States Patent
Oh et al.

(10) Patent No.: US 8,558,492 B2
(45) Date of Patent: Oct. 15, 2013

(54) APPARATUS FOR DRIVING MOTOR OF ELECTRIC VEHICLE

(75) Inventors: Jaeseok Oh, Seoul (KR); Jinha Choi, Seoul (KE); Junbo Yun, Seoul (KR); Dongcheol Lee, Seoul (KR); Junyoung Lim, Seoul (KR); Dongwoo Lee, Seoul (KR); Junggi Lee, Seoul (KR); Jungbum Kim, Seoul (KR); Jinsoo Park, Seoul (KR); Seunghee Ryu, Seoul (KR); Gilwon Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 12/943,640

(22) Filed: Nov. 10, 2010

(65) Prior Publication Data
US 2011/0115416 A1 May 19, 2011

(30) Foreign Application Priority Data

Nov. 13, 2009 (KR) .................. 10-2009-0109899
Nov. 13, 2009 (KR) .................. 10-2009-0109906

(51) Int. Cl.
*H02H 7/08* (2006.01)

(52) U.S. Cl.
USPC .............. 318/400.21; 318/139; 318/400.26; 318/722; 318/434

(58) Field of Classification Search
USPC .......... 318/700, 400.15, 400.21, 400.26, 722, 318/434; 180/65.1, 65.21, 65.31, 65.8; 363/13, 15, 109, 120, 121, 123, 124, 363/126
See application file for complete search history.

(56) References Cited

U.S. PATENT DOCUMENTS

| 5,883,484 A * | 3/1999 | Akao ........................... 318/700 |
| 5,994,789 A | 11/1999 | Ochiai |
| 6,049,185 A * | 4/2000 | Ikeda ........................... 318/442 |
| 6,420,793 B1 * | 7/2002 | Gale et al. ...................... 290/34 |
| 6,841,966 B2 * | 1/2005 | Umemura et al. ............ 318/701 |
| 7,439,704 B2 * | 10/2008 | Nojima et al. ................ 318/801 |
| 7,531,982 B2 * | 5/2009 | Okamura et al. ............ 318/701 |

FOREIGN PATENT DOCUMENTS

| EP | 0488240 A1 | 6/1992 |
| JP | 2005-253154 | 9/2005 |

* cited by examiner

*Primary Examiner* — Bentsu Ro
*Assistant Examiner* — Thai Dinh
(74) *Attorney, Agent, or Firm* — McKenna Long & Aldridge LLP

(57) ABSTRACT

An apparatus for driving a motor of an electric vehicle is provided. The apparatus includes a capacitor supplied with power by a battery; an inverter configured to include a plurality of switching elements, convert direct current (DC) power stored in the capacitor into alternating current (AC) power in accordance with the switching of the switching elements and drive a motor with the AC power; and a capacitor protector provided between the battery and the capacitor and configured to consume initial power supplied by the battery at an early stage of the supply of power by the battery, the capacitor protector including a common resistor that consumes the DC power stored in the capacitor when the capacitor is discharged. Therefore, it is possible to guarantee the reliability of the apparatus.

15 Claims, 12 Drawing Sheets

APPARATUS FOR DRIVING MOTOR OF ELECTRIC VEHICLE

CROSS-REFERENCE TO RELATED APPLICATION

This application claims the priority benefit of Korean Patent Application No. 10-2009-0109906 and 10-2009-0109899, filed on Nov. 13, 2009, in the Korean Intellectual Property Office, the disclosure of which is incorporated herein by reference.

BACKGROUND OF THE INVENTION

1. Field of the Invention

The present invention relates to an apparatus for driving a motor of an electric vehicle, and more particularly, to an apparatus for driving a motor of an electric vehicle, which can guarantee high reliability.

2. Description of the Related Art

Automobiles, which have been developed in line with the introduction of internal combustion engines, are considered as the things of necessity, but have various problems associated with environment and energy. As part of the efforts to address the problems of fossil fuel-powered automobiles, electric vehicles, which use electric motors for propulsion, and hybrid vehicles, which combine internal combustion engines and electric motors, have been developed, and various attempts have been made to improve the performance of electric vehicles or hybrid vehicles, which use batteries and motors as the sources of power.

SUMMARY OF THE INVENTION

The present invention provides an apparatus for driving a motor of an electric vehicle, which can guarantee high reliability.

The present invention also provides an apparatus for driving a motor of an electric vehicle, which can efficiently manage energy.

According to an aspect of the present invention, there is provided an apparatus for driving a motor of an electric vehicle, the apparatus including a capacitor supplied with power by a battery; an inverter configured to include a plurality of switching elements, convert direct current (DC) power stored in the capacitor into alternating current (AC) power in accordance with the switching of the switching elements and drive a motor with the AC power; and a capacitor protector provided between the battery and the capacitor and configured to consume initial power supplied by the battery at an early stage of the supply of power by the battery, the capacitor protector including a common resistor that consumes the DC power stored in the capacitor when the capacitor is discharged.

According to another aspect of the present invention, there is provided an apparatus for driving a motor of an electric vehicle, the apparatus including a capacitor supplied with power by a battery; an inverter configured to include a plurality of switching elements, convert DC power stored in the capacitor into AC power in accordance with the switching of the switching elements and drive a motor with the AC power; and a DC-to-DC converter configured to convert the DC power stored in the capacitor and supply the converted DC power to the battery when the capacitor is discharged.

According to another aspect of the present invention, there is provided an apparatus for driving a motor of an electric vehicle, the apparatus including a capacitor supplied with power by a battery; an inverter configured to include a plurality of switching elements, convert DC power stored in the capacitor into AC power in accordance with the switching of the switching elements and drive a motor with the AC power; and a DC-to-DC converter configured to supply power from the battery to the capacitor and supply the DC power stored in the capacitor to the battery.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Exemplary embodiments of the present invention will be described below with reference to the attached drawings.

The terms "module" and "unit" are used to signify components in order to help the understanding of the components and thus should not be considered as having specific meanings or roles. Accordingly, the terms "module" and "unit" may be used interchangeably.

Figure 1:
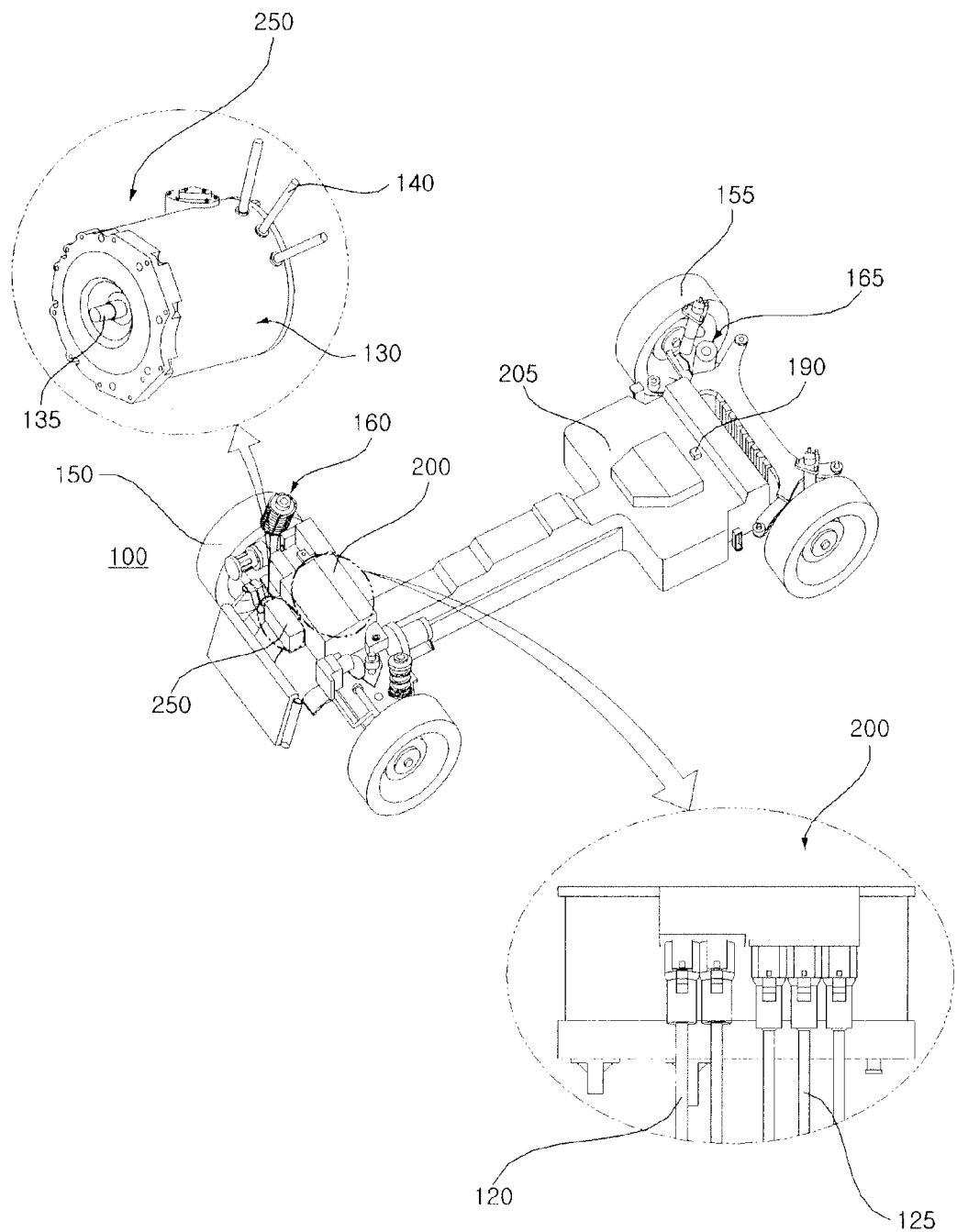
FIG. 1 illustrates a schematic diagram of the body of an electric vehicle according to an exemplary embodiment of the present invention.

FIG. 1 illustrates a schematic diagram of the body of an electric vehicle 100 according to an exemplary embodiment of the present invention. Referring to FIG. 1, the electric vehicle 100 may include a battery 205, an apparatus 200 for driving a motor, which is supplied with power by the battery 205, a motor 250, which is driven to rotate by the apparatus 200, front wheels 150 and rear wheels 155, which are driven to rotate by the motor 250, front and rear suspension devices 160 and 165, which prevent road noise, bumps and vibrations from being directly transferred to the body of the electric vehicle 100, and an inclination sensor 190, which detects an inclination of the body of the electric vehicle 100. The electric vehicle 100 may also include a driving gear (not shown), which changes the rotational speed of the motor 250 according to gear ratio.

The inclination sensor 190 may detect an inclination of the body of the electric vehicle 100, and may input the detected inclination to an electronic controller (not shown). The inclination sensor 190 may include a gyro sensor or a level gauge sensor.

The inclination sensor 190 is illustrated in FIG. 1 as being disposed above the battery 205, but the present invention is not restricted to this. That is, the inclination sensor 190 may be disposed near the front wheels 150 or the rear wheels 155, or more than one inclination sensor 190 may be provided at both the front wheels 150 and the rear wheels 155.

The battery 205 may supply power to the apparatus 200, and particularly, to a capacitor C of the apparatus 200.

The battery 205 may include a group of unit cells. The group of unit cells may be managed to provide a uniform voltage by a battery management system (BMS).

For example, the BMS may detect a voltage Vbat (hereinafter referred to as the battery voltage Vbat) of the battery 205, and may provide the battery voltage Vbat to the electronic controller or an inverter controller 230 of the apparatus 200. When the battery voltage Vbat decreases below its lowest limit, the direct current (DC) power stored in the capacitor C may be supplied to the battery 205. When the battery voltage Vbat exceeds its highest limit, the battery 205 may supply DC power to the capacitor C.

The battery 205 may include a secondary cell, which is a rechargeable battery, but the present invention is not restricted to this.

The apparatus 200 may be supplied with DC power via power input cables 120 by the battery 205. The apparatus 200 may convert the DC power into alternating current (AC) power, and may supply the AC power to the motor 250. The AC power supplied to the motor 250 may be three-phase AC power. The apparatus 200 may supply three-phase AC power to the motor 250 via three-phase output cables 125 provided therein. The apparatus 200 is illustrated in FIG. 1 as including three three-phase output cables 125, but the present invention is not restricted to this. That is, the apparatus 200 may include a single three-phase output cable 125 having three sub-cables.

The structure of the apparatus 200 will hereinafter be described in further detail with reference to FIG. 2.

Figure 2:
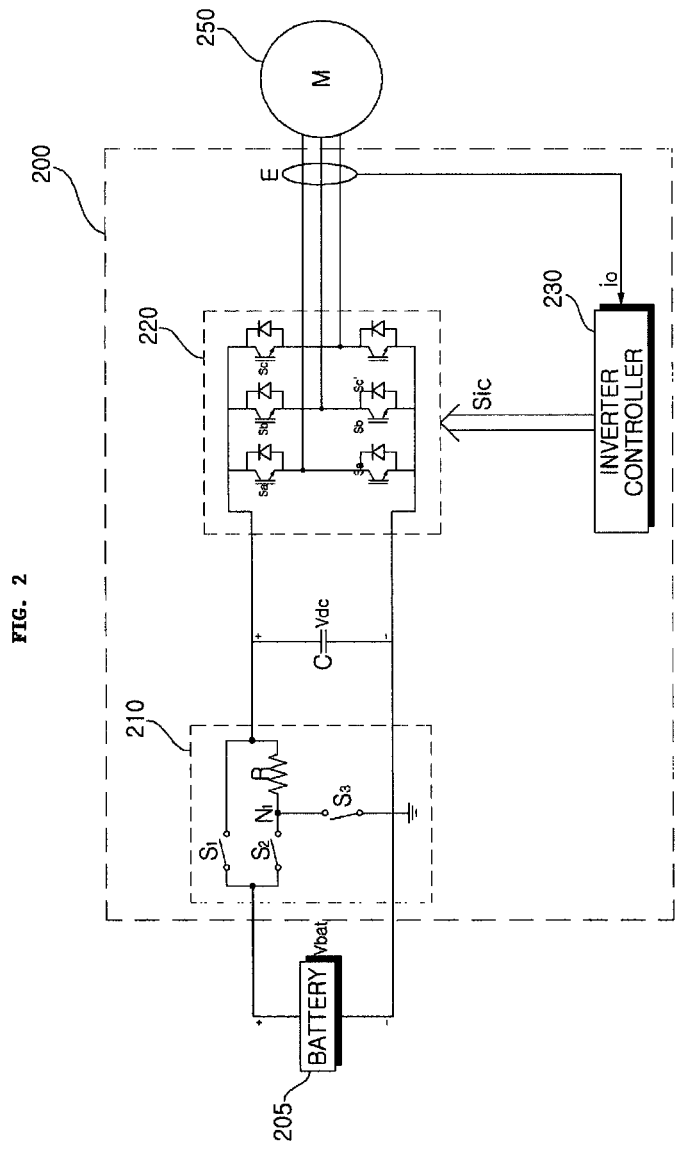
FIG. 2 illustrates a circuit diagram of an apparatus for driving a motor of an electric vehicle according to an exemplary embodiment of the present invention.

Referring to FIG. 2, the motor 250 may include a stator 130, which does not rotate but is fixed, and a rotor 135, which rotates. The motor 250 may include input cables 140, and may be supplied with AC power via the input cables 140 by the apparatus 200. The motor 250 may be a three-phase motor. If variable voltage/variable frequency AC power is applied to the coils of the stator 130 for each phase, the rotational speed of the rotor 135 may vary according to the frequency applied.

The motor 250 may be implemented as an induction motor, a brushless DC motor (BLDC) motor or a reluctance motor.

The driving gear may be provided on one side of the motor 250. The driving gear may change the rotational energy of the motor 250 according to gear ratio. The rotational energy provided by the driving gear may be transmitted to the front wheels 150 and/or the rear wheels 155 so that the electric vehicle 100 can move.

The front suspension device 160 may support the front wheels 150, and the rear suspension device 165 may support the rear wheels 155. Each of the front and rear suspension devices 160 and 165 may be vertically supported by a spring or attenuator and may thus be able to prevent road vibrations from directly affecting the body of the electric vehicle 100.

The electric vehicle 100 may also include a steering device (not shown), which is provided near the front wheels 150. The steering device may adjust the direction of the front wheels 150 so as for a driver to drive the electric vehicle 100 in a desired direction. The electric vehicle 100 may also include the electronic controller, which generally controls the electronic devices included in the electronic vehicle 100. More specifically, the electronic controller may control the electronic devices included in the electric vehicle 100 to properly operate, and may control the BMS.

The electronic controller may create driving instructions for various driving modes (such as a forward driving mode, a reverse driving mode, an idle driving mode and a parking mode) based on sensing data provided by the inclination sensor 190, a speed sensor (not shown), which senses the speed of the electric vehicle 100, a brake sensor (not shown), which detects the application of a brake pedal (not shown), and an accelerator sensor (not shown), which detects the application of an accelerator pedal. The driving instructions created by the electronic controller may be torque or speed instructions.

The electric vehicle 100 may be a pure electric vehicle using an electric battery and a motor or a hybrid electric vehicle using an electric battery, a motor and an engine. The electric vehicle 100 may also include a transmission (not shown) and a switching element (not shown) for choosing between the battery 206 and an engine. Hybrid electric vehicles are classified into series hybrid electric vehicles, which convert mechanical energy provided by engines into electric energy and drive motors with the electric energy, and parallel hybrid electric vehicles, which use both mechanical energy generated by engines and electric energy provided by batteries.

Figure 3:
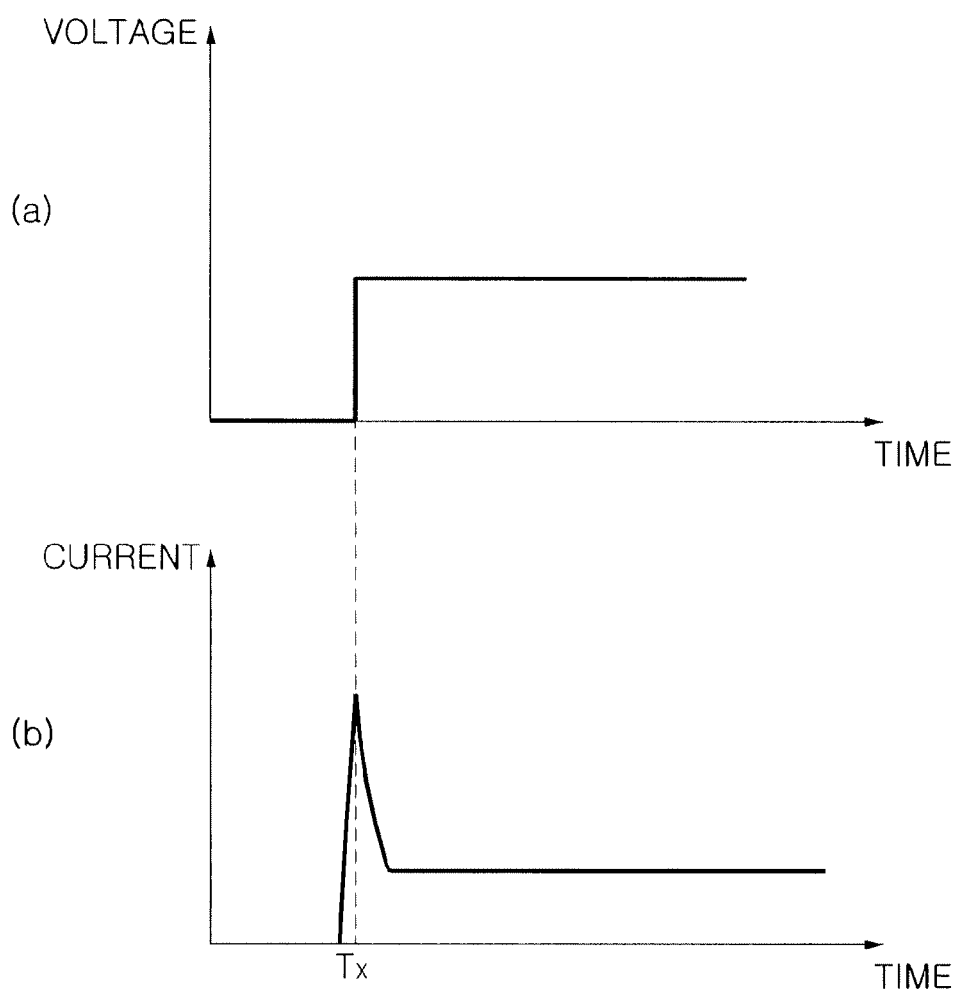
FIGS. 3 and 4 illustrate diagrams for explaining the operation of the apparatus shown in FIG. 2.
Figure 4:
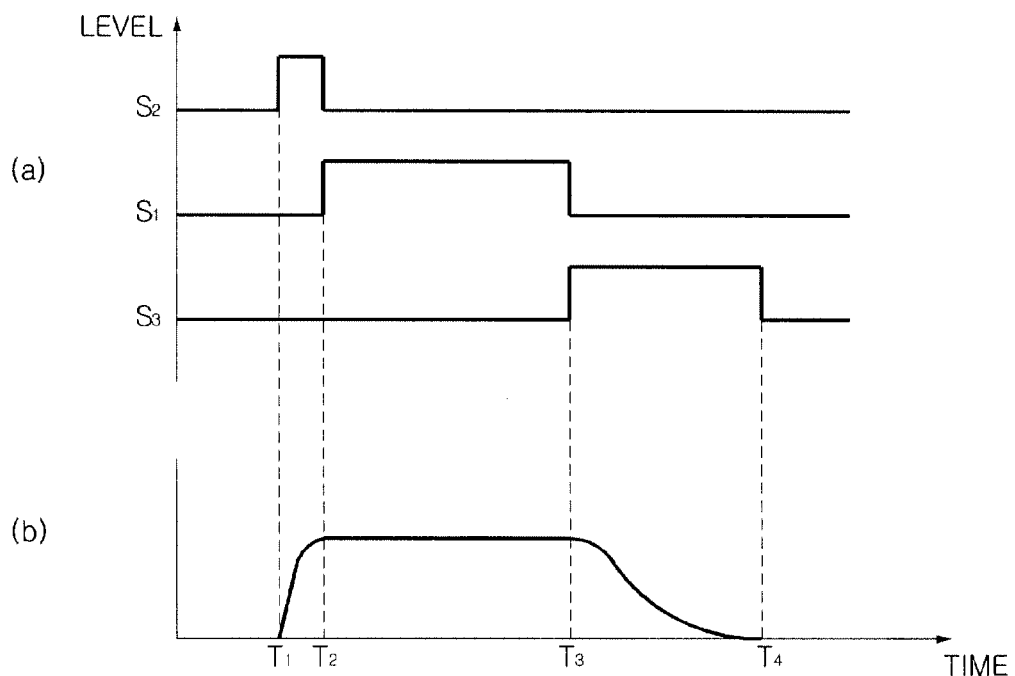

FIG. 2 illustrates a circuit diagram of the apparatus 200, and FIGS. 3 and 4 illustrate diagrams for explaining the operation of the apparatus 200. Referring to FIG. 2, the apparatus 200 may include the capacitor C, a capacitor protector 210, an inverter 220 and the inverter controller 230. The apparatus 200 may also include an output current detector E, which detects an output current that flows in the motor 250.

The capacitor C may smooth and store power supplied by the battery 205. Both ends of the capacitor C are referred to as DC terminals or DC link terminals. DC power smoothed at the DC terminals may be applied to the inverter 220 and may thus be used to generate AC power.

The apparatus 200 may also include a DC terminal voltage detector (not shown), which detects a voltage Vdc (hereinafter referred to as the DC terminal voltage Vdc) at the DC terminals.

The DC terminal voltage detector may include a resistor and an amplifier. The DC terminal voltage Vdc may be a pulse-type discrete signal, and may be input to the inverter controller 230 or the electronic controller. The DC terminal voltage Vdc may be used to manage the power of the battery 205.

Since the battery 205 can supply a voltage of several hundreds of volts, a plurality of batteries 205 may be connected in parallel between the DC terminals.

The capacitor protector 210 may prevent an inrush current from flowing into the capacitor C when the apparatus 200 is turned on, and may discharge the capacitor C in order to protect the capacitor C when the apparatus 200 is turned off.

The capacitor protector 210 may be provided between the battery 205 and the capacitor C. The capacitor protector 210 may consume the initial power that the capacitor C is charged with when the apparatus 200 is initially supplied with power by the battery 205 or may consume DC power stored in the capacitor C when the capacitor C is discharged.

The capacitor protector 210 may include a first switching element $S_1$, which is provided between the battery 205 and the capacitor C, a second switching element $S_2$, which is provided between the battery 205 and the capacitor C and is connected in parallel to the first switching element $S_1$, a common resistor R, which is provided between the battery 205 and the second switching element $S_2$, and a third resistor $S_3$, which is provided between a ground source and a node $N_1$ between the second switching element $S_2$ and the common resistor R. The first through third switching elements $S_1$ through $S_3$ may be relays.

FIG. 3 illustrates timing diagrams for explaining an inrush current that may be generated at an initial stage of supplying power from the battery 205 to the apparatus 200. When power is supplied instantaneously from the battery 205 to the capacitor C at a time Tx, as shown in FIG. 3(a), an instantaneous peak current may be applied to the capacitor C, thereby increasing the probability of damage to the capacitor C.

FIG. 4 illustrates timing diagrams for explaining AC power variations in the capacitor C over the course of the operation of the capacitor protector 210. Referring to FIG. 4, if the second switching element $S_2$ is turned on at a time $T_1$, DC power from the battery 205 may be stored in the capacitor C through the second switching element $S_2$ and the common resistor R. The DC power may be consumed by the common resistor R, and thus, the DC terminal voltage Vdc may gradually increase.

If, at a time $T_2$, the second switching element $S_2$ is turned off and the first switching element $S_1$ is turned on, DC power from the battery 205 may be stored in the capacitor C through the first switching element $S_1$. Thus, the DC terminal voltage Vdc may be uniformly maintained.

If, at a time $T_3$, the first switching element $S_1$ is turned off and the third switching element $S_3$ is turned on, DC power from the capacitor C may flow to the ground source through the common resistor R and the third switching element $S_3$. In this case, DC power from the battery 205 may be consumed by the common resistor R, and thus, the DC terminal voltage Vdc may gradually decrease.

If the third switching element $S_3$ is turned off at a time $T_4$, the capacitor C may be discharged completely. The time $T_4$ may vary according to the DC terminal voltage Vdc.

In this manner, it is possible to improve the stability of circuitry and secure reliability by allowing the common resistor R to consume the DC power stored in the capacitor C. In addition, it is possible to facilitate the design of circuitry and reduce the manufacturing cost.

The inverter 220 may include a plurality of inverter switching elements. The inverter 220 may convert smoothed DC power obtained by turning on or off the inverter switching elements into voltage variable/frequency variable three-phase AC, and may output the voltage variable/frequency variable three-phase AC to the motor 250.

More specifically, the inverter 220 may include three upper arm switching elements Sa, Sb and Sc and three lower arm switching elements Sa', Sb', and Sc', which are paired with and connected in parallel to the three upper arm switching elements Sa, Sb and Sc, respectively. A diode may be connected in inverse parallel to each of the switching elements Sa, Sa', Sb, Sb', Sc and Sc'.

The switching elements Sa, Sa', Sb, Sb', Sc and Sc' may be turned on or off in accordance with an inverter switching control signal Sic provided by the inverter controller 230. As a result, the inverter 220 may be able to provide voltage variable/frequency variable three-phase AC to the motor 250.

The output current detector E may detect an output current io that flows between the inverter 220 and the motor 250, i.e., the current that flows into the motor 250. The output current detector E may detect output currents of all phases, or may detect output currents of one or two phases using three-phase balance.

The output current detector E may be disposed between the inverter 220 and the motor 250, and may use a current sensor, a current transformer or a shunt resistor for current detection. For example, the shunt resistor may be connected to the lower arm switching elements Sa', Sb' and Sc' of the inverter 220.

The output current io, which is a pulse-type discrete signal, may be applied to the inverter controller 230, and may be used to estimate an input current. The output current io may also be used to generate the inverter switching control signal Sic.

The inverter controller 230 may control the operation of the inverter 220.

If the motor 250 is a sensor-type motor with a speed sensor attached, the inverter controller 230 may generate an inverter switching control signal Sic based on speed measurements from the speed sensor, and may output the inverter switching control signal Sic to the inverter 220.

On the other hand, if the motor 250 is a sensorless type motor with no speed sensor attached, the inverter controller 230 may generate an inverter switching control signal Sic based on the output current io detected by the output current detector E, and may output the inverter switching control signal Sic to the inverter 220. The inverter switching control signal Sic may be a switching control signal for use in pulse width modulation. The operation of the inverter controller 230, and particularly, the generation of the inverter switching control signal Sic, will be described later in further detail with reference to FIG. 5.

The inverter controller 230 may control the switching of the switching elements $S_1$ through $S_3$ of the capacitor protector 210. For this, the inverter controller 230 may be supplied with the DC terminal voltage Vdc and the battery voltage Vbat.

Figure 5:
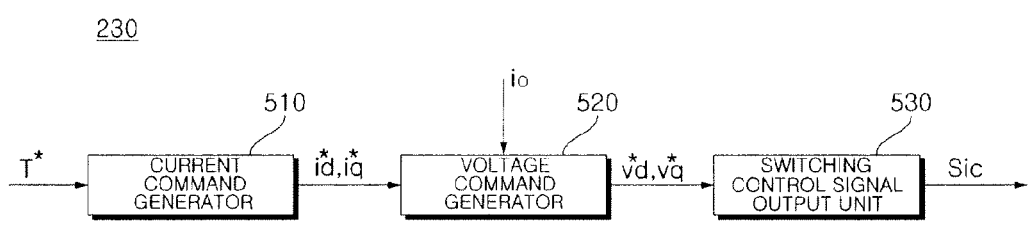
FIG. 5 illustrates a block diagram of an inverter controller according to an exemplary embodiment of the present invention.

FIG. 5 illustrates a block diagram of the inverter controller 230. Referring to FIG. 5, the inverter controller 230 may include a current command generator 510, a voltage command generator 520 and a switching control signal output unit 530.

The inverter controller 230 may also include an axis converter (not shown). The axis converter may convert the output current io, which is a three-phase current, into a d- or q-axis current or may convert a d- or q-axis current into a tri-axis current.

The current command generator 510 may generate current command values i*d and i*q based on a torque command value T* provided by the electronic controller by, for example, comparing the mechanical equation and the electric equation of the motor 250. In order to prevent the current command values i*d and i*q from exceeding an allowable range, the current command generator 510 may include a limiter (not shown).

The voltage command generator 520 may generate voltage command values v*d and v*q based on the output current io and the current command values i*d and i*q by, for example, performing Proportional-Integral (PI) control on the differences between the output current io and the current command values i*d and i*q. For this, the voltage command generator 520 may include a PI controller (not shown). The voltage command generator 520 may also include a limiter (not shown) in order to prevent the voltage command values v*d and v*q from exceeding an allowable range.

The switching control signal output unit 530 may generate an inverter switching control signal Sic, which is a PWM signal, based on the voltage command values v*d and v*q, and may output the inverter switching control signal Sic to the inverter 220. As a result, the switching elements Sa, Sa', Sb, Sb', Sc and Sc' of the inverter 220 may be switched on or off.

The inverter controller 230 may perform torque control based on the torque command value T*, but the present invention is not restricted to this. That is, the inverter controller 230 may be configured to perform speed control based on a speed command value. For example, the inverter controller 230 may generate the current command values i*d and i*q based on a speed command value v* provided by the electronic controller and a motor speed v. If the motor 250 is equipped with a speed sensor, the motor speed v may be a speed measured by the speed sensor. On the other hand, if the motor 250 is equipped with no speed sensor, the motor speed v may be estimated based on the output current io.

The block diagram shown in FIG. 5 is exemplary. Thus, some of the constituent elements of the inverter controller 230 may be omitted, or various elements, other than those illustrated in FIG. 5, may be added to the inverter controller 230 according to the purpose of use of the inverter controller 230 or the motor 250. That is, when the inverter controller 230 is implemented, two or more of the constituent elements of the inverter controller 230 may be combined into one constituent element, or one constituent element may be divided into two or more constituent elements, if appropriate. The above descriptions of the functions of the constituent elements of the inverter controller 230 are provided for exemplary purposes and are thus not intended to limit the scope of the present invention.

Figure 6:
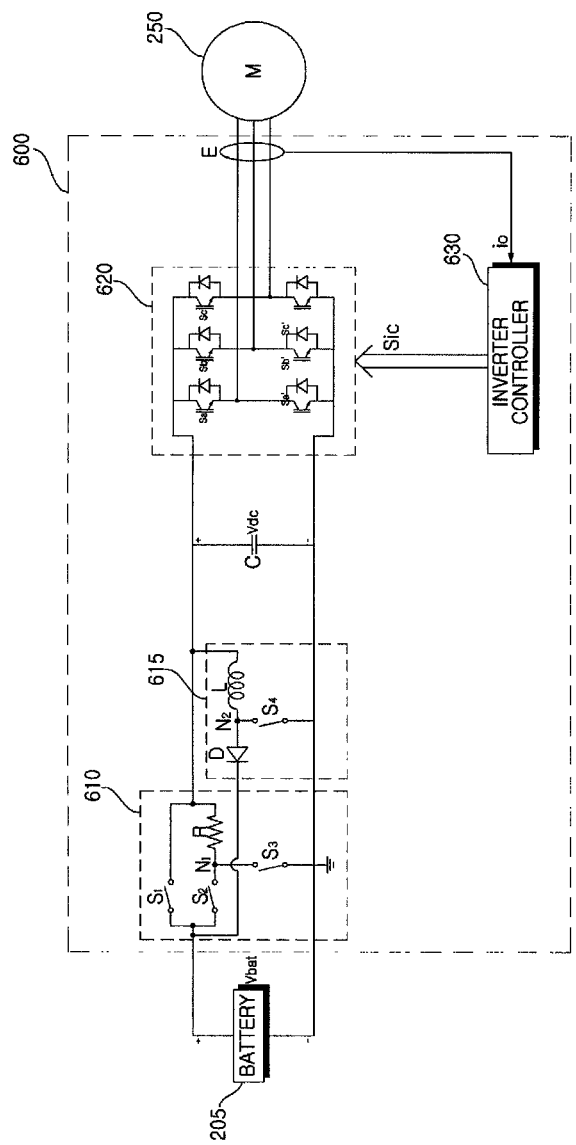
FIG. 6 illustrates a circuit diagram of an apparatus for driving a motor of an electric vehicle according to another exemplary embodiment of the present invention.
Figure 7:
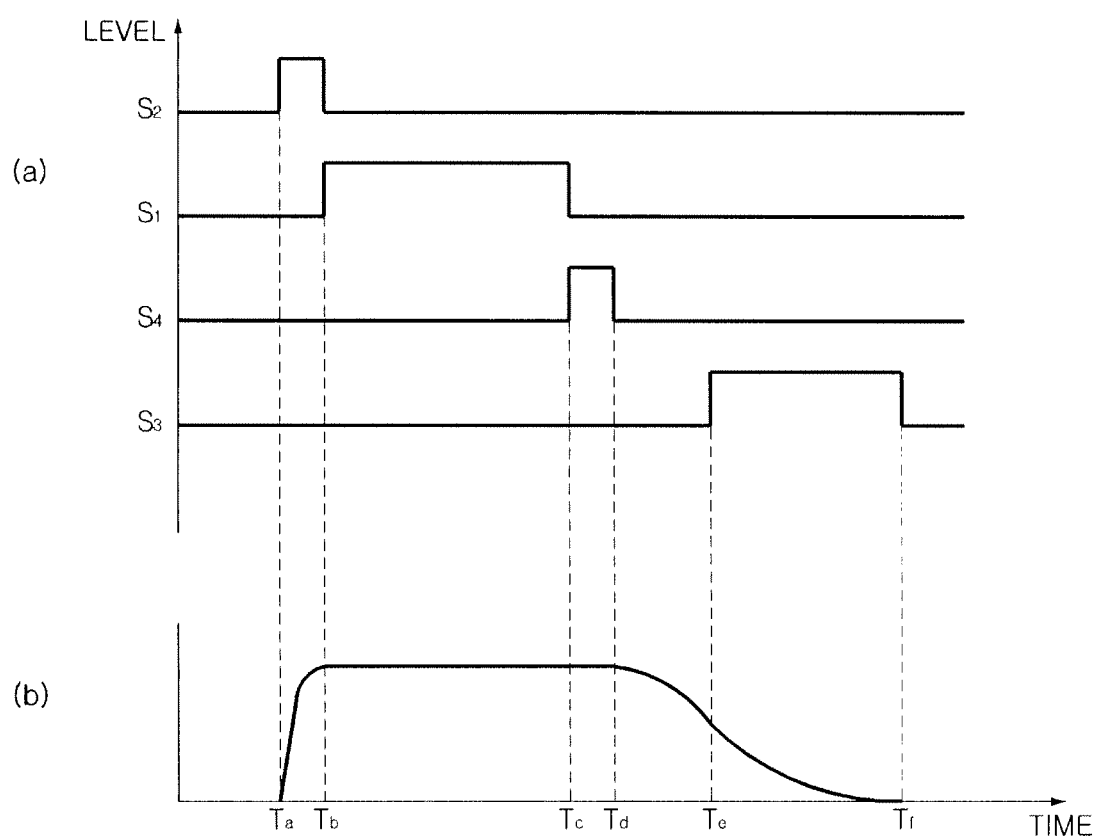
FIG. 7 illustrates diagrams for explaining the operation of the apparatus shown in FIG. 6.

FIG. 6 illustrates a circuit diagram of an apparatus 600 for driving a motor of an electric vehicle according to another exemplary embodiment of the present invention, and FIG. 7 illustrates timing diagrams for explaining the operation of the apparatus 600.

Referring to FIG. 6, the apparatus 600 may include a capacitor C, a capacitor protector 610, a DC-to-DC converter 615, an inverter 620 and an inverter controller 630. The apparatus 600 may also include an output current detector E, which detects an output current that flows in the motor 250.

The apparatus 600 is similar to the apparatus 200 shown in FIG. 2 in terms of structure and operation, and thus will hereinafter be described, focusing mainly on differences with the apparatus 200.

The structure of the capacitor protector 620 may be the same as the structure of the capacitor protector 210 shown in FIG. 2. The apparatus 600, unlike the apparatus 200 shown in FIG. 2, may include the DC-to-DC converter 615.

The DC-to-DC converter 615 may perform DC-to-DC conversion on a DC terminal voltage Vdc, which is the DC voltage stored in a capacitor C, and may supply the DC terminal voltage Vdc to the battery 205 before the discharging of the capacitor C.

For this, the DC-to-DC converter 615 may include a diode D and an inductor L, which are connected in series between the battery 205 and the capacitor C, and a fourth switching element $S_4$, which is connected between a ground source and a node $N_2$ between the diode D and the inductor L.

The DC-to-DC converter 615 may store the DC terminal voltage Vdc in the inductor L when the fourth switching element $S_4$ is turned on, and may supply the stored DC terminal voltage Vdc to the battery 205 when the fourth switching element $S_4$ is turned off.

The DC-to-DC converter 615 may be a boost converter. The fourth switching element $S_4$ may be an insulated gate bipolar transistor (IGBT) or a field effect transistor (FET).

The proportion of time during which the fourth switching element $S_4$ is turned on, i.e., the duty ratio of the fourth switching element $S_4$, may vary over time. For example, during the operation of a boost converter, as the DC terminal voltage Vdc decreases, the duty ratio of the fourth switching element $S_4$ may increase.

FIG. 7 illustrates timing diagrams for explaining the variation of the DC terminal voltage Vdc over the courses of the operations of the capacitor protector 610 and the DC-to-DC converter 615. The operation of the apparatus 600 during a time period between $T_a$ and $T_b$ shown in FIG. 7 is the same as the operation of the apparatus 200 during the time period between $T_1$ and $T_2$ shown in FIG. 4, and thus, a detailed description thereof will be omitted.

If the fourth switching element $S_4$ is turned on at a time $T_c$, the inductor L and the capacitor C may form a closed loop, and thus, part of the energy corresponding to the DC terminal voltage Vdc may be stored in the inductor L. Since there is no consumption of power at the $T_c$, the DC terminal voltage Vdc does not vary much.

Thereafter, if the fourth switching element $S_4$ is turned off at a time $T_d$, the energy stored in the inductor L or the DC terminal voltage Vdc may be supplied to the battery 205 through the diode D. As a result, the DC terminal voltage Vdc may gradually decrease.

Thereafter, if a third switching element $S_3$ is turned on at a time $T_e$, the DC terminal voltage Vdc may flow to the ground source through a common resistor R and the third switching element $S_3$. Since the DC terminal voltage Vdc is consumed by the common resistor R, the DC terminal voltage Vdc may further decrease.

Thereafter, if the third switching element $S_3$ is turned off at a time $T_f$, the capacitor C may be completely discharged. The time $T_f$ may vary according to the DC terminal voltage Vdc.

In this exemplary embodiment, it is possible to effectively discharge the capacitor C by supplying the DC terminal voltage Vdc stored in the capacitor C to the battery 205 and then allowing the common resistor R to consume the DC terminal voltage Vdc. Therefore, it is possible to effectively manage energy and quickly discharge the capacitor C.

The inverter controller 630, like the inverter controller 230 shown in FIG. 5, may include a current command generator (not shown), a voltage command generator (not shown) and a switching control signal output unit (not shown).

Figure 8:
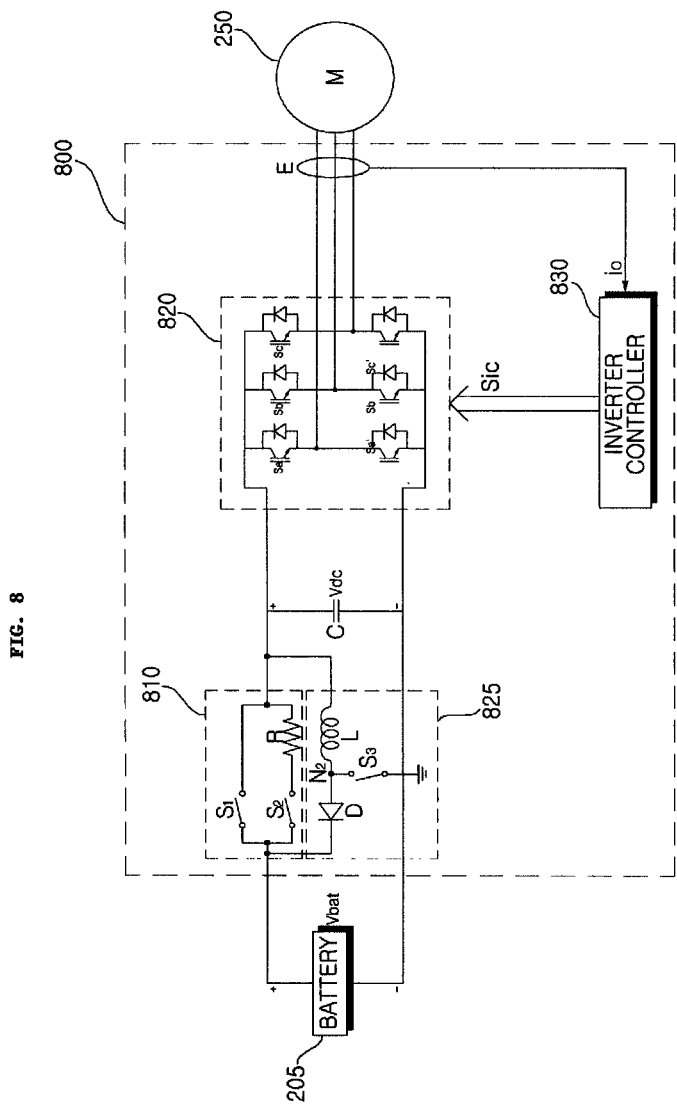
FIG. 8 illustrates a circuit diagram of an apparatus for driving a motor of an electric vehicle according to another exemplary embodiment of the present invention.

FIG. 8 illustrates a circuit diagram of an apparatus 800 for driving a motor of an electric vehicle according to another exemplary embodiment of the present invention, and FIG. 7 illustrates timing diagrams for explaining the operation of the apparatus 800.

Referring to FIG. 8, the apparatus 800 may include a capacitor C, an inrush current preventer 810, a DC-to-DC converter 825, an inverter 820, and an inverter controller 830. The apparatus 800 may also include an output current detector E, which detects an output current that flows in the motor 250.

The apparatus 800 is similar to the apparatus 600 shown in FIG. 6 in terms of structure and operation, and thus will hereinafter be described, focusing mainly on differences with the apparatus 600.

The inrush current preventer 810 may prevent an inrush current at an initial stage of the supply of power from the battery 205. For this, the inrush current preventer 810 may include first and second switching elements $S_1$ and $S_2$, which are provided between the battery 205 and a capacitor C and are connected in parallel to each other, and a resistor R, which is provided between the second switching element $S_2$ and the capacitor C. The first and second switching elements $S_1$ and $S_2$ may be relays.

The DC-to-DC converter 825 may have the same structure as the DC-to-DC converter 615 shown in FIG. 6, and thus, a detailed description thereof will be omitted.

Figure 9:
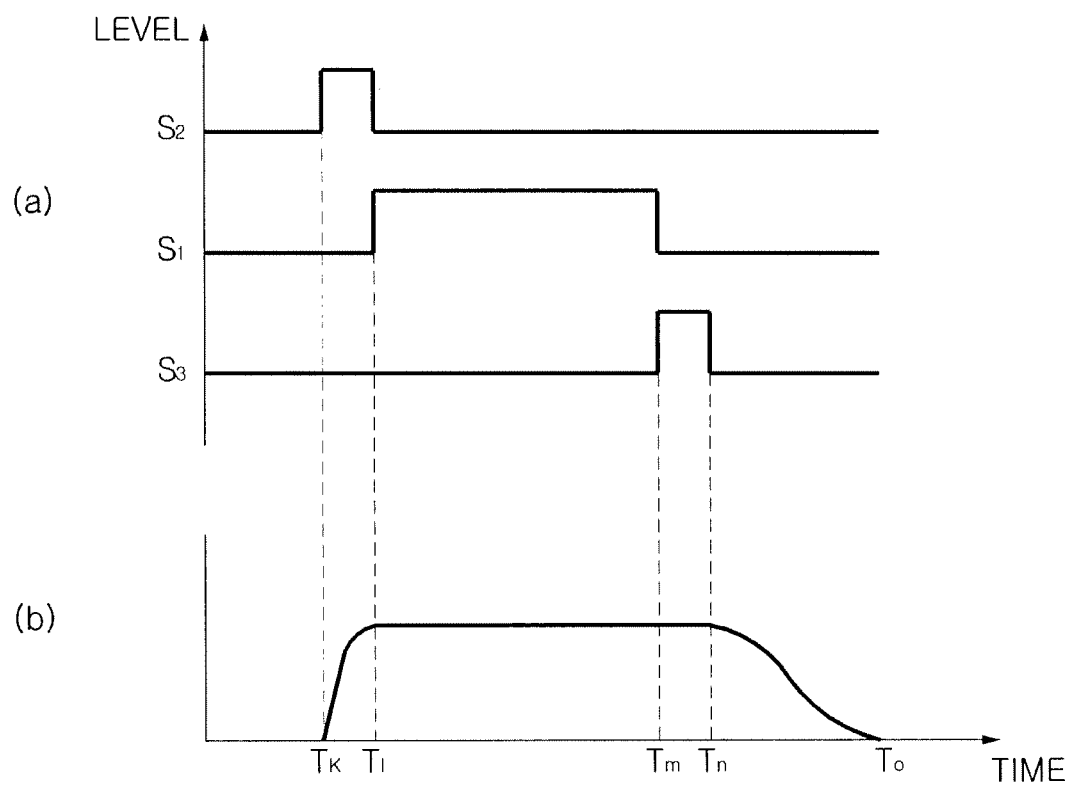
FIG. 9 illustrates a diagram for explaining the operation of the apparatus shown in FIG. 8.

FIG. 9 illustrates timing diagrams for explaining the variation of the DC terminal voltage Vdc over the courses of the operations of the inrush current preventer 810 and the DC-to-DC converter 825. The operation of the apparatus 800 during a time period between $T_k$ and $T_l$ shown in FIG. 7 is the same as the operation of the apparatus 200 during the time period between $T_1$ and $T_2$ shown in FIG. 4, and thus, a detailed description thereof will be omitted.

If the third switching element $S_3$ is turned on at a time $T_m$, an inductor L and a capacitor C of the DC-to-DC converter 825 may form a closed loop, and thus, part of the energy corresponding to the DC terminal voltage Vdc may be stored in the inductor L. Since there is no consumption of power at the $T_m$, the DC terminal voltage Vdc does not vary much.

Thereafter, if the third switching element $S_3$ is turned off at a time $T_n$, the energy stored in the inductor L or the DC terminal voltage Vdc may be supplied to the battery 205 through the diode D. As a result, the DC terminal voltage Vdc may gradually decrease.

The capacitor C may be completely discharged at a time $T_o$. The time $T_o$ may vary according to the DC terminal voltage Vdc.

In this exemplary embodiment, it is possible to effectively manage energy by supplying the DC terminal voltage Vdc stored in the capacitor C to the battery 205.

The inverter controller 830, like the inverter controller 230 shown in FIG. 5, may include a current command generator (not shown), a voltage command generator (not shown) and a switching control signal output unit (not shown).

Figure 10:
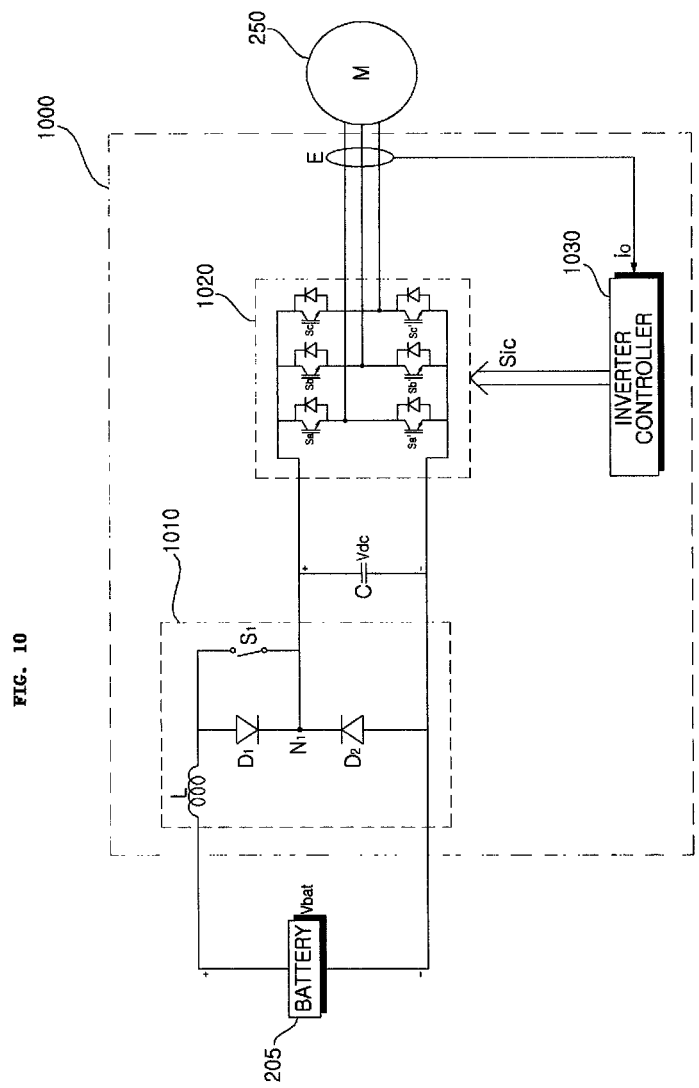
FIG. 10 illustrates a circuit diagram of an apparatus for driving a motor of an electric vehicle according to another exemplary embodiment of the present invention.

FIG. 10 illustrates a circuit diagram of an apparatus 1000 for driving a motor of an electric vehicle according to another exemplary embodiment of the present invention, and FIG. 7 illustrates timing diagrams for explaining the operation of the apparatus 1000.

Referring to FIG. 10, the apparatus 1000 may include a capacitor C, a DC-to-DC converter 1010, an inverter 1020, and an inverter controller 1030. The apparatus 1000 may also include an output current detector E, which detects an output current that flows in the motor 250.

The capacitor C may smooth and store power supplied by the battery 205. DC power smoothed at both ends (i.e., DC terminals) of the capacitor C may be applied to the inverter 220 and may thus be used to generate AC power.

The apparatus 1000 may also include a DC terminal voltage detector (not shown), which detects a DC terminal voltage Vdc from the DC terminals.

The DC terminal voltage detector may include a resistor and an amplifier. The DC terminal voltage Vdc may be a pulse-type discrete signal, and may be input to the inverter controller 1030 or the electronic controller of the electric vehicle 100. The DC terminal voltage Vdc may be used to manage the power of the battery 205.

Since the battery 205 can supply a voltage of several hundreds of volts, a plurality of batteries 205 may be connected in parallel between the DC terminals.

In order to efficiently manage energy, the apparatus 1000 may include a DC-to-DC converter 1010, which can supply DC power to the capacitor C. The DC-to-DC converter 1010 may supply a battery voltage Vbat from the battery 205 to the capacitor C.

If the DC terminal voltage Vdc is higher than a reference level or the battery voltage Vbat, the DC-to-DC converter 1010 may supply the DC terminal voltage Vdc to the battery 205 in order to protect the capacitor C and effectively manage energy.

If the direction of a torque command value T* output by the electronic controller of the electric vehicle 100 is not the same as the moving direction of the electric vehicle 100, for example, if the direction of the torque command value T* is opposite to the moving direction of the electric vehicle 100 as in the case of driving on a downward slope, the DC-to-DC converter 1010 may supply the DC terminal voltage Vdc to the battery 205.

On the other hand, if the direction of the torque command value T* is the same as the moving direction of the electric vehicle 100 as in the case of driving on an upward slope, the DC-to-DC converter 1010 may supply the battery power Vbat from the battery 205 to the capacitor C.

The DC-to-DC converter 1010 may include a switching element $S_1$ and a diode $D_1$, which are connected in parallel between the battery 205 and the capacitor C, and an inductor L, which is connected between the switching element $S_1$ and the battery 205. A diode $D_2$ may be connected to both ends of the capacitor C, and a first node $N_1$ may be provided between the diodes $D_1$ and $D_2$. The diode $D_1$ may be a parasitic diode of the switching element $S_1$.

The DC-to-DC converter 1010 may be a buck converter. The switching element $S_1$ may be an IGBT or FET.

The proportion of time during which the switching element $S_1$ is turned on, i.e., the duty ratio of the switching element $S_1$, may vary over time. For example, during the operation of a buck converter, as the DC terminal voltage Vdc decreases, the duty ratio of the switching element $S_1$ may decrease.

Figure 11:
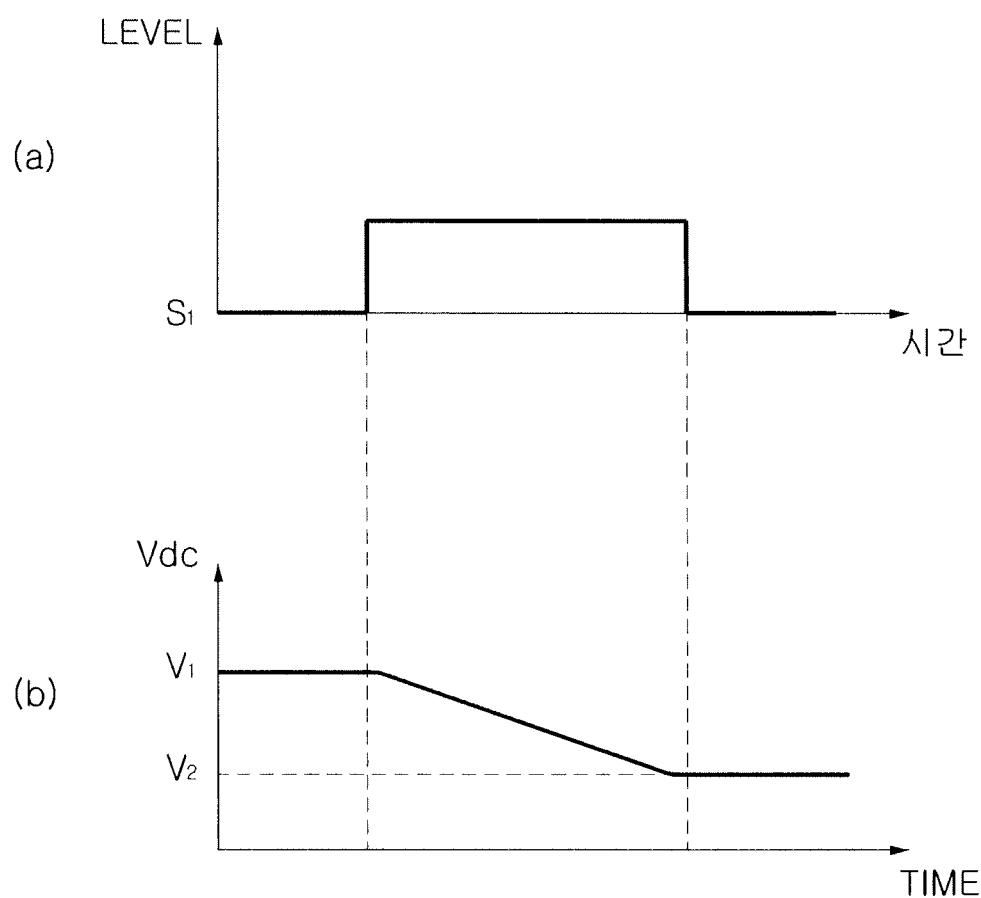
FIG. 11 illustrates a diagram for explaining the operation of the apparatus shown in FIG. 10.

FIG. 11 illustrates timing diagrams for explaining the variation of the DC terminal voltage Vdc over the course of the operation of the DC-to-DC converter 1010. Referring to FIG. 11, the DC terminal voltage Vdc is charged to and uniformly maintained at a first level $V_1$ at an early stage of the operation of the DC-to-DC converter 1010.

If the switching element $S_1$ is turned on at a time $T_1$, the DC terminal voltage Vdc may be supplied to the battery 205 through the switching element $S_1$ and the inductor L, and may thus gradually decrease from the first level $V_1$ to a second level $V_2$.

If the DC terminal voltage Vdc is higher than the battery power Vbat due to the turning on of the switching element $S_1$, the DC terminal voltage Vdc may be supplied to the battery 205. In this regard, it may be determined when to turn on the switching element $S_1$ by comparing the DC terminal voltage Vdc and the battery power Vbat. The switching element $S_1$ may be turned on when the direction of a torque command value T* output by the electronic controller of the electric vehicle 100 is not the same as the moving direction of the electric vehicle 100.

Thereafter, if the switching element $S_1$ is turned off at a time $T_2$, the DC terminal voltage may be uniformly maintained at the second level $V_2$.

In this manner, it is possible to effectively manage energy by supplying the DC power in the capacitor C to the battery 205 so as to prevent waste of energy.

The inverter 1020 may include a plurality of inverter switching elements: three upper arm switching elements Sa, Sb and Sc and three lower arm switching elements Sa', Sb' and Sc'. The inverter 1020 may convert smoothed DC power obtained by turning on or off the inverter switching elements Sa, Sb, Sc, Sa', Sb' and Sc' into voltage variable/frequency variable three-phase AC, and may output the voltage variable/frequency variable three-phase AC to the motor 250.

The inverter switching elements Sa, Sb, Sc, Sa', Sb' and Sc' may be turned on or off in accordance with an inverter switching control signal Sic provided by the inverter controller 1030. As a result, the inverter 1020 may be able to provide voltage variable/frequency variable three-phase AC to the motor 250.

The output current detector E may detect an output current io that flows between the inverter 1020 and the motor 250, i.e., the current that flows into the motor 250. The output current detector E may detect output currents of all phases, or may detect output currents of one or two phases using three-phase balance.

The output current detector E may be disposed between the inverter 1020 and the motor 250, and may use a current sensor, a current transformer or a shunt resistor for current detection. For example, the shunt resistor may be connected to the three lower arm switching elements Sa', Sb' and Sc' of the inverter 220.

The output current io, which is a pulse-type discrete signal, may be applied to the inverter controller 1030, and may be used to estimate an input current. The output current io may also be used to generate the inverter switching control signal Sic.

The inverter controller 230 may control the operation of the inverter 220.

If the motor 250 is a sensor-type motor with a speed sensor attached, the inverter controller 1030 may generate an inverter switching control signal Sic based on speed measurements from the speed sensor, and may output the inverter switching control signal Sic to the inverter 1020.

On the other hand, if the motor 250 is a sensorless type motor with no speed sensor attached, the inverter controller 1030 may generate an inverter switching control signal Sic based on the output current io detected by the output current detector E, and may output the inverter switching control signal Sic to the inverter 1020. The inverter switching control signal Sic may be a switching control signal for use in pulse width modulation.

The inverter controller 1030 may control the switching of the switching element $S_1$ of the DC-to-DC converter 1010. For this, the inverter controller 1030 may be supplied with the torque command value T*, the DC terminal voltage Vdc and the battery voltage Vbat.

The inverter controller 1030, like the inverter controller 230 shown in FIG. 5, may include a current command generator, a voltage command generator and a switching control signal output unit.

Figure 12:
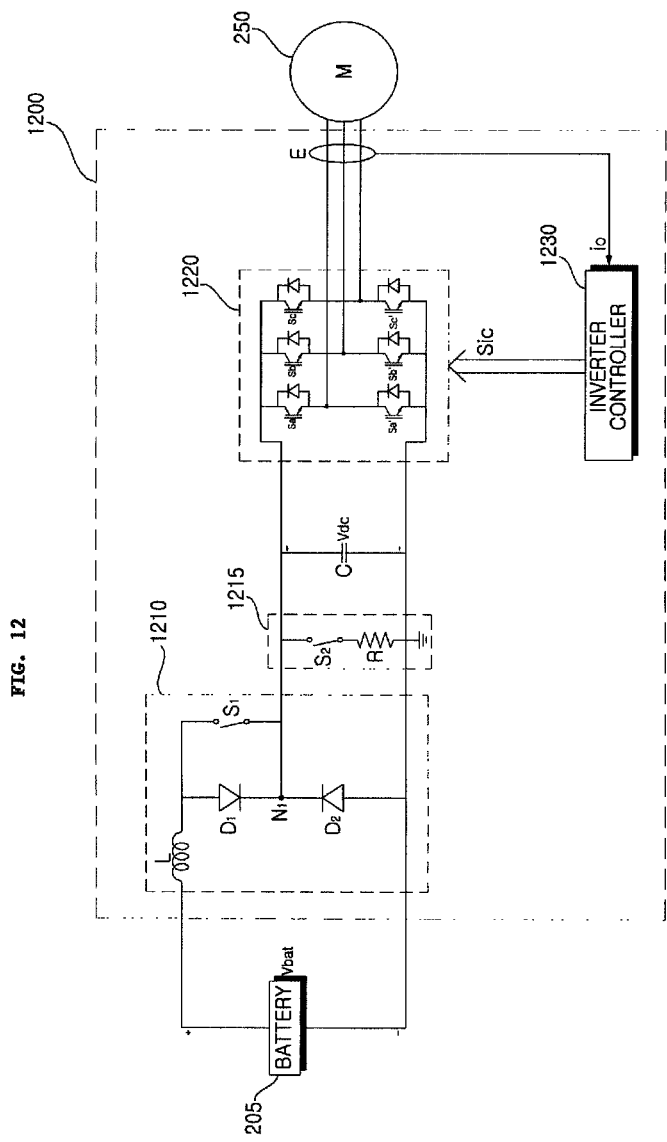
FIG. 12 illustrates a circuit diagram of an apparatus for driving a motor of an electric vehicle according to another exemplary embodiment of the present invention.

FIG. 12 illustrates a circuit diagram of an apparatus 1200 for driving a motor of an electric vehicle according to another exemplary embodiment of the present invention, and FIG. 7 illustrates timing diagrams for explaining the operation of the apparatus 1200.

Referring to FIG. 12, the apparatus 1200 may include a capacitor C, a DC-to-DC converter 1210, a power discharger 1215, an inverter 1220 and an inverter controller 1230. The apparatus 1200 may also include an output current detector E, which detects an output current that flows in the motor 250.

The apparatus 1200 is similar to the apparatus 1000 shown in FIG. 10 in terms of structure and operation, and thus will hereinafter be described, focusing mainly on differences with the apparatus 1000.

The structure of the DC-to-DC converter 1210 may be the same as the structure of the DC-to-DC converter 1010 shown in FIG. 10. The apparatus 1200, unlike the apparatus 1000, may include the power discharger 1215.

After the supply of a DC terminal voltage Vdc stored in the capacitor C to the battery 205 by the DC-to-DC converter 1210, the power discharger 1215 may discharge the capacitor C.

The power discharger 1215 may include a switching element $S_2$ and a resistor R, which are connected in series between both ends of the capacitor C.

When the switching element $S_2$ is turned on, the power discharger 1215 may flow the DC terminal voltage Vdc to a ground source and may thus discharge the capacitor C.

Figure 13:
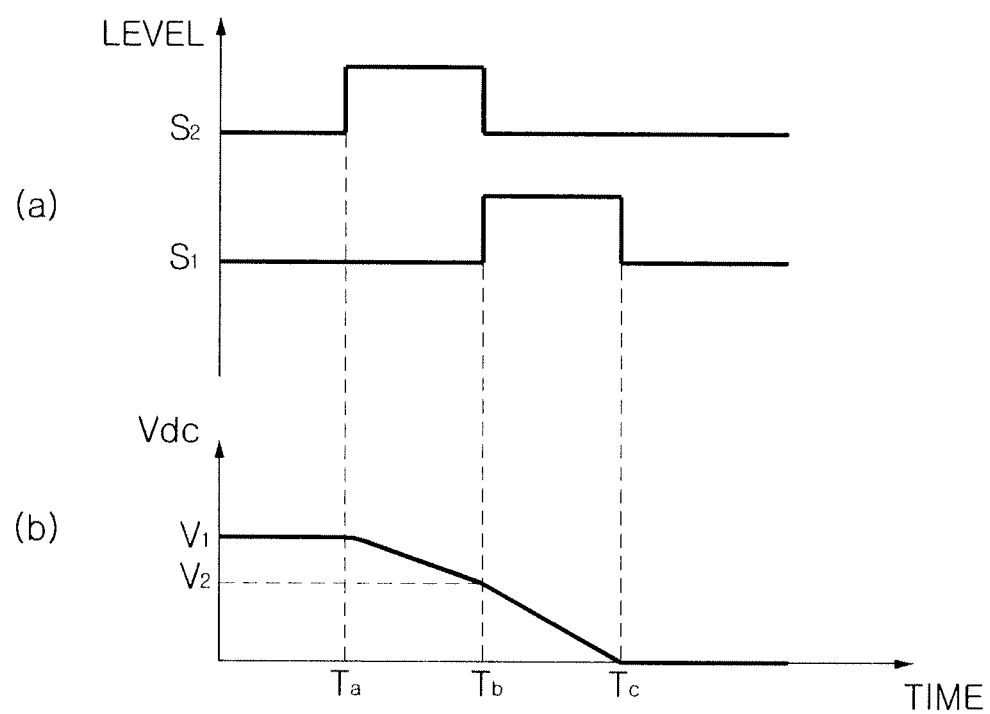
FIG. 13 illustrates a diagram for explaining the operation of the apparatus shown in FIG. 12.

FIG. 13 illustrates timing diagrams for explaining the variation of the DC terminal voltage Vdc over the courses of the operations of the DC-to-DC converter 1210 and the power discharger 1215.

The operation of the apparatus 1200 during a time period between $T_a$ and $T_b$ shown in FIG. 13 is the same as the operation of the apparatus 1000 during a time period between $T_1$ and $T_2$ shown in FIG. 11, and thus, a detailed description thereof will be omitted.

If, at a time $T_c$, a switching element $S_1$ of the DC-to-DC converter 1210 is turned off and the switching element $S_2$ of the power discharger 1215 is turned on, the DC terminal voltage Vdc may flow to the ground source through the switching element $S_2$ and the resistor R, and thus, the capacitor C may be discharged.

If the switching element $S_2$ is turned off at a time $T_d$, the capacitor C may be completely discharged. The time $T_d$ may vary according to the DC terminal voltage Vdc.

In this manner, it is possible to effectively manage energy and guarantee the stability of circuitry by supplying the DC power present in the capacitor C, i.e., the DC terminal voltage Vdc, to the battery 205 and then discharging the capacitor C with the use of the resistor R.

The inverter controller 1230, like the inverter controller 230 shown in FIG. 5, may include a current command generator, a voltage command generator and a switching control signal output unit.

The apparatus for driving a motor of an electric vehicle according to the present invention is not restricted to the exemplary embodiments set forth herein. Therefore, variations and combinations of the exemplary embodiments set forth herein may fall within the scope of the present invention.

As described above, according to the present invention, it is possible to improve the stability of circuitry and secure reliability by consuming DC power from a battery when the DC power is initially supplied from the battery or when a capacitor is discharged.

According to the present invention, it is possible to facilitate the design of circuitry and reduce the manufacturing cost of an apparatus for driving a motor of an electric vehicle by consuming the DC power stored in the capacitor with the use of a common resistor.

According to the present invention, it is possible to efficiently manage energy by supplying the DC power stored in the capacitor to the battery.

According to the present invention, it is possible to efficiently manage energy and quickly discharge the capacitor by supplying the DC power stored in the capacitor to the battery and consuming the remaining DC power in the capacitor with the use of a common resistor.

According to the present invention, if the DC power stored in the capacitor is greater than the power from the battery, the DC power stored in the capacitor can be supplied to the battery. Thus, it is possible to efficiently manage energy and reduce the probability of damage to the capacitor. Therefore, it is possible to improve the stability and reliability of circuitry.

According to the present invention, if the moving direction of an electric vehicle is different from a torque command value, it is possible to supply the DC power stored in the capacitor to the battery and thus to efficiently manage energy.

According to the present invention, it is possible to improve the stability and reliability of circuitry by supplying the DC power stored in the capacitor to the battery and discharging the capacitor.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for driving a motor of an electric vehicle, the apparatus comprising:
    a capacitor that stores power from a battery;
    an inverter including a plurality of switching elements that convert the power stored in the capacitor into alternating current (AC) power in accordance with the switching of the switching elements in order to drive the motor with the AC power; and
    a capacitor protector provided between the battery and the capacitor that consumes at least some of the power supplied by the battery when the capacitor is initially charged by the battery, the capacitor protector further consuming at least some of the power stored in the capacitor when the capacitor is discharged,
    wherein the capacitor protector includes:
    a first switching element provided between the battery and the capacitor;
    a second switching element and a resistor provided between the battery and the capacitor, and connected in series to each other, the second switching element and the resistor connected in parallel to the first switching element; and
    a third switching element provided between a ground source and a node between the second switching element and the resistor.

2. The apparatus of claim 1, wherein:
    when the power is initially supplied by the battery, the second switching element is turned on and the capacitor protector supplies the initial power to the capacitor through the resistor; and
    when the capacitor is discharged, the third switching element is turned on and the power stored in the capacitor is discharged to the ground source through the resistor.

3. The apparatus of claim 1, wherein, during the supply of power by the battery the second switching element is turned off and the first switching element is turned on such that the capacitor protector supplies power from the battery to the capacitor through the first switching element.

4. The apparatus of claim 1, further comprising a controller that outputs an inverter switching control signal, the inverter switching control signal being generated based on an output current that flows in the motor.

5. The apparatus of claim 4, wherein the controller includes:
    a current command generator that generates a current command value based on a torque command value;
    a voltage command generator that generates a voltage command value based on the current command value and the output current; and
    a switching control signal output unit that generates the inverter switching control signal based on the voltage command value and output the inverter switching control signal.

6. The apparatus of claim 1, further comprising a DC-to-DC converter, wherein the power stored in the capacitor is supplied to the battery through the DC-to-DC converter.

7. The apparatus of claim 6, wherein the DC-to-DC converter includes:
    a diode and an inductor provided between the battery and the capacitor, and connected in series to each other; and
    a fourth switching element provided between a ground source and a node between the diode and the inductor.

8. The apparatus of claim 7, wherein the DC-to-DC converter stores at least some of the power discharged from the capacitor in the inductor when the fourth switching element is turned on, and supplies the stored power in the inductor to the battery when the fourth switching element is turned off.

9. An apparatus for driving a motor of an electric vehicle, the apparatus comprising:
    a capacitor that stores power from a battery;
    an inverter including a plurality of switching elements that convert the power stored in the capacitor into alternating (AC) power in accordance with the switching of the switching elements in order to drive the motor with the AC power;
    a DC-to-DC converter, wherein the power that is supplied from the battery to the capacitor and the stored power in the capacitor that is supplied to the battery are supplied through the DC-to-DC converter; and
    a power discharger that discharges the capacitor,
    wherein the power discharger includes a discharge switching element and a resistor connected in series between both ends of the capacitor.

10. The apparatus of claim 9, wherein the DC-to-DC converter includes:
    a switching element and a diode provided between the battery and the capacitor, and in parallel to each other; and
    an inductor provided between the switching element and the battery.

11. The apparatus of claim 10, wherein, when the switching element is turned off, the DC-to-DC converter supplies the power from the battery to the capacitor through the inductor and the diode.

12. The apparatus of claim 10, wherein, when the switching element is turned on, the DC-to-DC converter supplies the power stored in the capacitor to the battery through the inductor.

13. The apparatus of claim 9, wherein, if the power stored in the capacitor is greater than the power from the battery, the DC-to-DC converter supplies the power stored in the capacitor to the battery.

14. The apparatus of claim 9, wherein, if the moving direction of the electric vehicle is not the same as a torque command value, the DC-to-DC converter supplies the power stored in the capacitor to the battery.

15. The apparatus of claim 9, wherein, if the moving direction of the electric vehicle is the same as a torque command value, the DC-to-DC converter supplies the power from the battery to the capacitor.

* * * * *